INVENTOR.
MILTON M. GARVIN

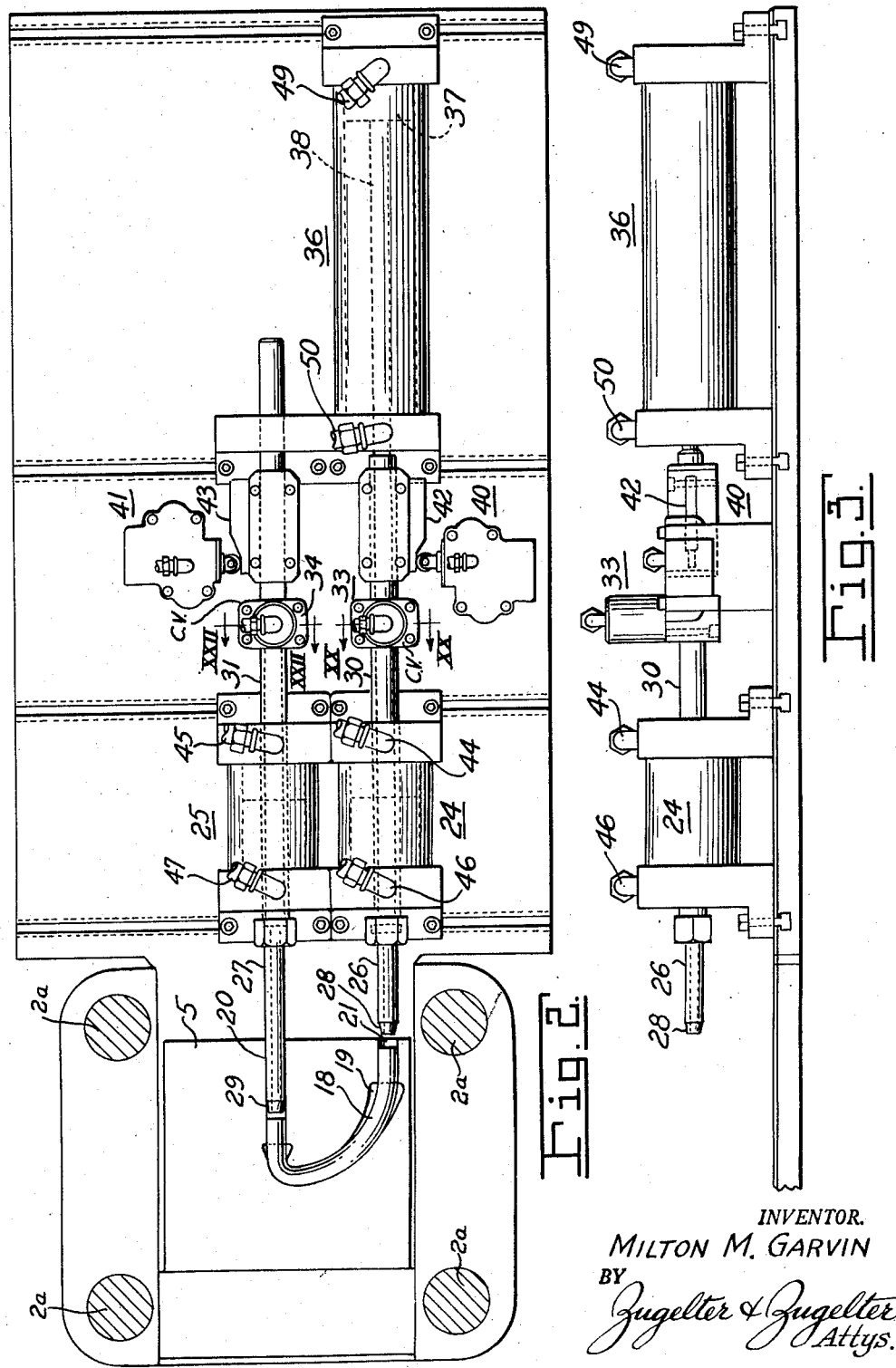

Sept. 8, 1959

M. M. GARVIN 2,902,962

MACHINES FOR SHAPING HOLLOW TUBULAR OBJECTS

Filed Jan. 7, 1955

INVENTOR.
MILTON M. GARVIN
BY
Zugelter & Zugelter
Attys.

Sept. 8, 1959     M. M. GARVIN     2,902,962
MACHINES FOR SHAPING HOLLOW TUBULAR OBJECTS
Filed Jan. 7, 1955     6 Sheets-Sheet 4

INVENTOR.
MILTON M. GARVIN
BY
Zugelter & Zugelter
Attys.

INVENTOR.
MILTON M. GARVIN
BY Zugelter & Zugelter
Attys.

Sept. 8, 1959 M. M. GARVIN 2,902,962
MACHINES FOR SHAPING HOLLOW TUBULAR OBJECTS
Filed Jan. 7, 1955 6 Sheets-Sheet 6

INVENTOR.
MILTON M. GARVIN
BY
Zugelter & Zugelter
Attys.

under the provisions of 35 U.S.C. 112

United States Patent Office 2,902,962
Patented Sept. 8, 1959

2,902,962

MACHINES FOR SHAPING HOLLOW TUBULAR OBJECTS

Milton M. Garvin, Delhi Township, Hamilton County, Ohio, assignor, by mesne assignments, to American Radiator & Standard Sanitary Corporation, New York, N.Y., a corporation of Delaware Application January 7, 1955, Serial No. 480,364

3 Claims. (Cl. 113—44)

This invention relates to a machine for shaping a hollow metal tubular blank in a mold or die, the blank being bulged to the contour of the cavity of the mold by supplying increasing volumes of liquid under pressure to the interior of the blank or work piece and supplying metal into the portion of the blank within the cavity of the mold from an undeformed portion of the blank to maintain wall thickness in the bulged portion of the blank.

The invention of this application is an improvement on the invention of the application of Fred W. Leuthesser, Jr. and John A. Fox, Serial No. 278,238, filed March 24, 1952 now Patent No. 2,713,314.

The invention of this application includes a mold having relatively movable parts, mechanism for opening and closing the mold on a work piece and means for supplying liquid at increasing pressures and volumes into the work piece when the mold has been closed. The liquid supplying means includes a pair of hydraulic cylinder actuated seals which enter the open ends of the work piece, means for filling the work piece with liquid and scavenging air from the same and an hydraulic mechanism for supplying increasing volumes of liquid into the work piece to bulge the same. When the pressure of the primary liquid which supplied the increasing volumes of liquid to the work piece has reached a predetermined value, high pressure is supplied the hydraulic cylinders acting on the seals, that pressure being of a value sufficient to force a measured amount of tubular or undeformed stock into the mold cavity while at the same time the bulging pressure is maintained. The undeformed tubular stock forced into the metal cavity for reasons not precisely known is distributed uniformly throughout the walls of the bulged portion.

The apparatus of the invention includes a control system whereby the mold is automatically closed, the seals are automatically actuated into the ends of the work piece and the bulging and infeed operations are effected in a predetermined order and relationship one to the other, so that the amount of infeed of metal and the amount of bulging of the blank have such a correlation that the work piece does not rupture during the bulging and infeeding operation. When the bulging and infeed operations have been performed, the cycle comes to an end automatically, and the mold is opened. The bulged piece is then removed by the operator from the mold and a new piece inserted following which the operator actuates one or more control buttons by hand to repeat the cycle.

The apparatus is also so arranged that the operations of the machine may be controlled step by step manually.

An object of this invention is to provide a machine of the character set forth above in which the bulging and infeeding operations may be controlled automatically and closely correlated one to the other, thereby to closely regulate the relationship of the bulging of the piece in the mold and the infeeding of metal stock into the bulged portion.

A still further object of the invention is to provide apparatus whereby the aforesaid operations may be effected automatically and with a high degree of accuracy.

Other objects of the invention will be apparent to those of ordinary skill in the art to which the invention pertains from the following description taken in conjunction with the accompanying drawing.

In the drawings:

Fig. 2 is a top plan view partly in section showing the hydraulic power cylinders which actuate the seals into the work piece, bulging cylinder, and control means for accurately controlling the amount of infeed of tubular stock into the bulged portion of the work piece;

Fig. 3 is a view in side elevation of the apparatus shown in Fig. 2;

Figure 1:
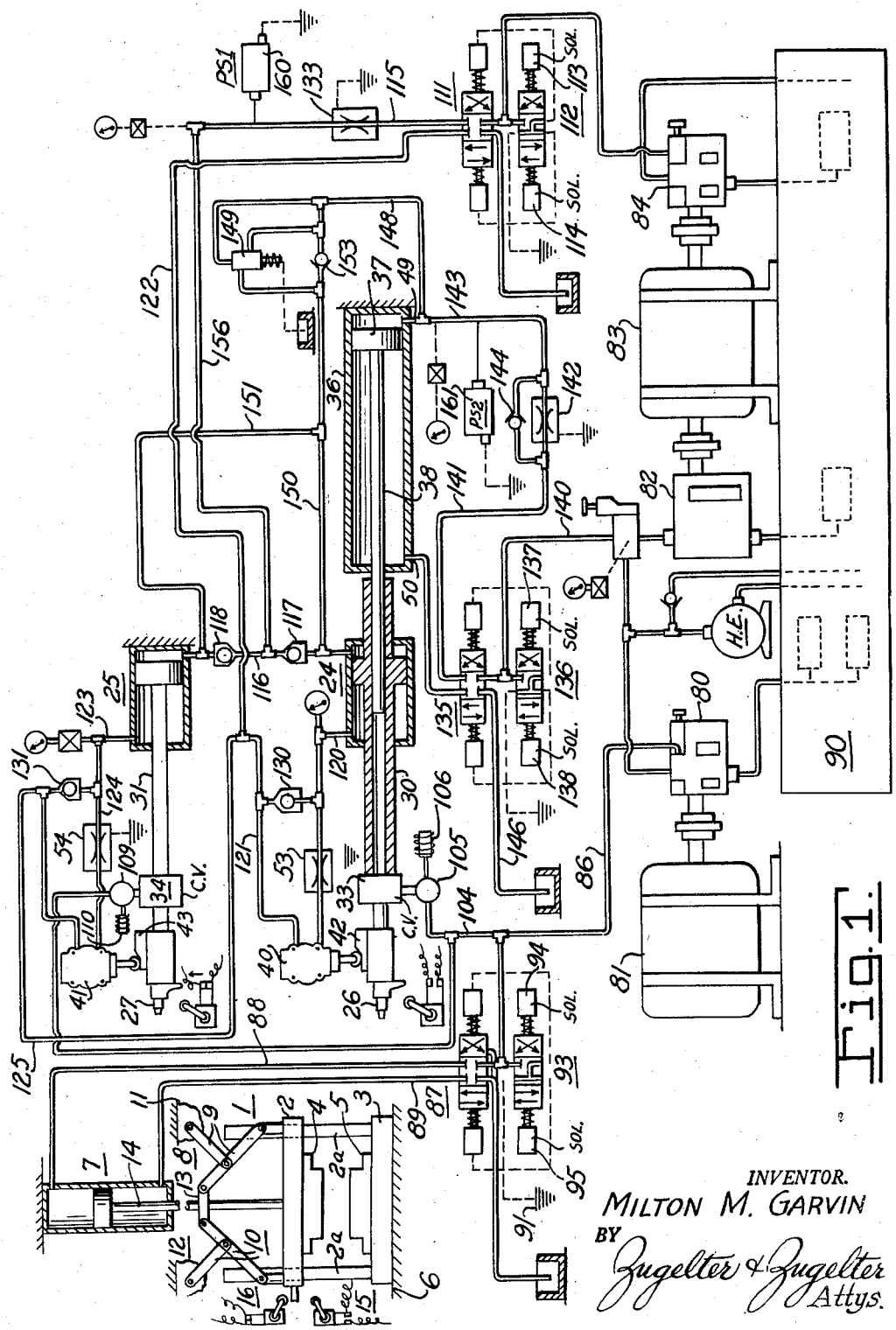
Figure 1 is a more or less diagrammatic view of a mold and apparatus associated therewith for effecting the aforesaid bulging and infeeding operations of a work piece placed in the mold. The control system for the apparatus illustrated in Fig. 1 is shown in other views.
Figure 4:
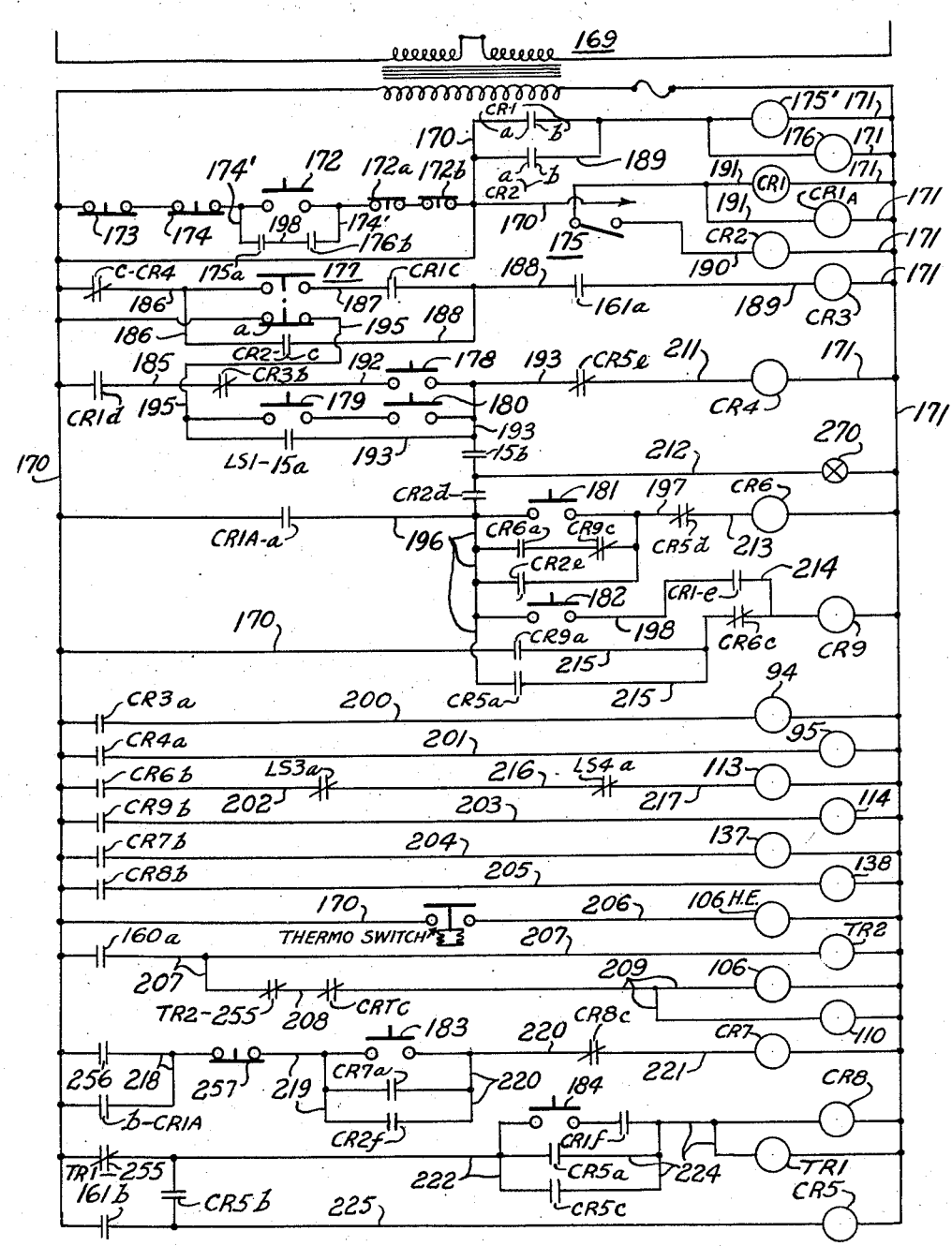
Fig. 4 is a diagrammatic view of the control circuit for effecting either manual or automatic control of the apparatus shown in Fig. 1.
Figure 15:
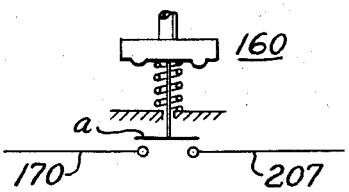
Figure 16:
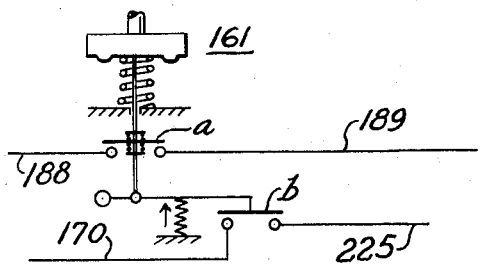
Figure 17:
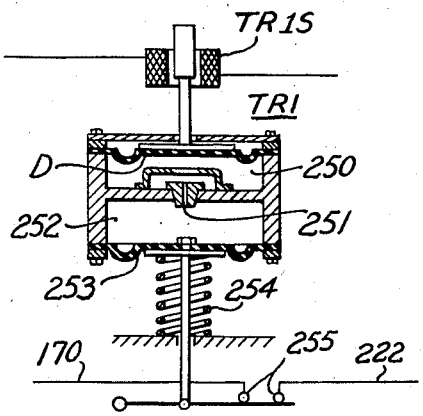
Figure 18:
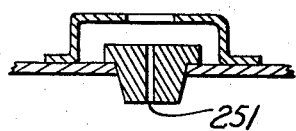
Figure 19:
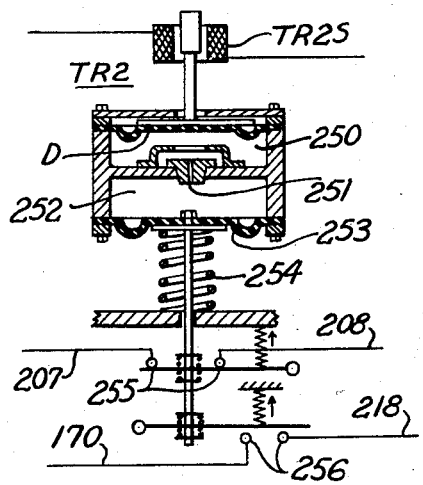
Figure 20:
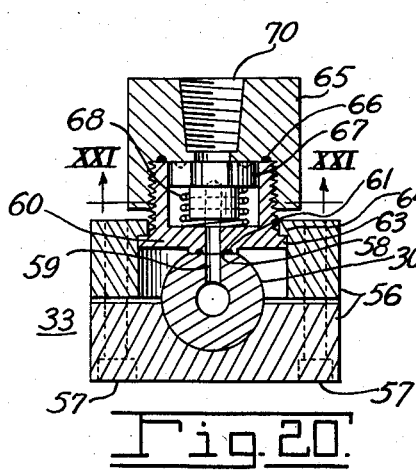
Figures 21, 22:
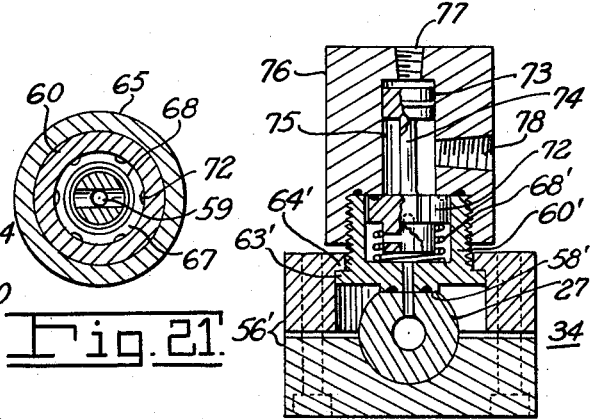
Figure 23:
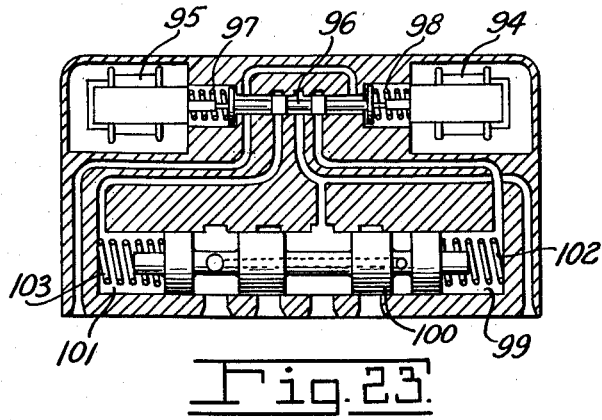

Figs. 5 through 14 both inclusive are more or less diagrammatic views of relays embodied in the control circuit of Fig. 4;

Figs. 15 and 16 are more or less diagrammatic views of pressure actuated switches embodied in the control circuit of Fig. 4;

Fig. 17 is a view of a timing relay having a normally closed switch or contact which is arranged to open;

Fig. 18 is a view of a detail embodied in the timing relay of Fig. 17;

Fig. 19 is a more or less diagrammatic view of a timing relay provided with a set of normally closed contact members which are timed open and a set of normally open contact members which are timed to close;

Fig. 20 is a view in section of a check valve taken on line XX—XX of Fig. 2;

Fig. 21 is a view in section taken on line XXI—XXI of Fig. 20;

Fig. 22 is a view in section of a check valve taken on line XXII—XXII of Fig. 2; and Fig. 23 is a view in section of a pilot valve embodied in the apparatus of Fig. 1.

In Fig. 1 of the drawings is illustrated a machine 1 having relatively movable platens 2 and 3 to which are attached mating mold parts 4 and 5. As illustrated platen 3 and mold part 5 are stationarily mounted on a bed 6, while platen 2 and its mold part 4 are movably mounted. Platen 2 is guided by posts 2a which extend through openings at the four corners thereof.

The mold is closed by moving platen 2 downwardly until mold 4 seats on mold 5. To actuate the platen 2 and its mold 4 to or from closed mold position, an hydraulic cylinder 7 and a toggle mechanism 8 are provided. The toggle mechanism comprises a pair of toggles 9 and 10. One of the toggle levers of each pair is secured to the platen 2 at opposite sides as shown, while the other toggle lever of each pair is connected to rigid supports 11 and 12. Two of the toggle levers extend to a point where they are connected by a link 13 which is connected to the piston rod 14 of the power cylinder. When the piston in cylinder 7 moves downwardly the toggles 9 and 10 are moved towards a vertical position. When they have reached that position the mold is closed. By maintaining pressure on the power cylinder the knees of the toggles 9 and 10 are held rigidly thereby holding the molds firmly closed with the required pressure.

When platen 2 arrives at closed position, a limit switch 15 is closed whereby the automatic control circuit may be rendered operative. The control circuit can not function unless the mold is closed. When the mold reaches open position platen 2 actuates a limit switch 16. Limit switch 16, as will be explained infra, renders the control circuit inoperative until the operator has manually closed a switch that initiates first the closing of the molds and secondly the operation of the control circuit and the apparatus governed thereby.

In Fig. 2, the mold 5 is illustrated in plan view with a work piece 18 in mold cavity 19. The mold cavity may be totally in one mold part such as in mold part 5 or it may be partly in the mold part 5 and partly in mold part 4, depending upon the shape of the article to be formed in the mold. As shown in Fig. 2 the cavity 19 has the shape of a plumbing fixture such as the swing spout of a sink faucet. It will be understood that the shape of the mold cavity may be designed to conform to that of any particular part to be formed in the mold.

As shown in Fig. 2 the mold part 5 is provided with runners 20 and 21 in which the ends of the work piece 18 are received. The runners 20 and 21 may be circular in cross section; the complementary parts of runners 20 and 21 may be in mold part 4.

The work piece 18 when in the closed mold, is supplied with increasing volumes of liquid such as oil or water at ever increasing pressures to cause the portion of the work piece within the mold cavity to expand and enlarge and to take the form of the cavity. Bulging liquid is supplied to the work piece through seal elements 26 and 27 attached to the left hand ends of the piston rods 30 and 31 of power cylinders 24 and 25. The forward ends of elements 26 and 27 are tapered as at 28 and 29 so that they will enter the open ends of the work piece, and form a tight seal therewith. The piston rods 30 and 31 also extend rearwardly through the head of the power cylinders 24 and 25 as shown. The hollow piston rods 30 and 31 are provided with check valves 33 and 34 by means of which liquid may be introduced into and through the work piece after the seals 26 and 27 have been seated in the ends thereof. The amount of liquid supplied through the check valves is sufficient to first scavenge the interiors of the work piece, the rods 30 and 31, and the seals 26 and 27 of air and then completely fill them with liquid. When the scavenging and filling has been accomplished, the check valves 33 and 34 are closed. The operation of the check valves 33 and 34 is automatic as will be explained infra.

In order to supply increasing volumes of liquid into the work piece a power cylinder 36, which may be called the forming cylinder, is provided. The cylinder 36 is provided with a piston 37 having a piston rod 38 therein that operates in the hollow of the piston rod 30. When the piston 37 is retracted the volume of liquid in front of the piston 38 in the hollow of rod 30 is sufficient to effect all the bulging that the piece in the mold will take in one operation.

As the bulging pressure is supplied to the work piece by power cylinder 36 and the bulging has progressed to a predetermined point, metal from either or both of the end portions of the piece 18 confined within the runners 20 and 21, may be fed into the cavity 19 by the power cylinders 24 or 25, or both. A lesser amount of the metal may be fed by one power cylinder than by the other, or equal amounts may be fed into the mold cavity at the same time. The bulging pressure is maintained during the infeed operation so that at no time is the bulging of the blank arrested until the bulged portion engages the walls of the mold cavity.

For reasons which are not too apparent, the metal fed from the end portions of the blank into the cavity while the bulging is taking place, flows from one end of the portion of the work piece in the cavity to the other. The distribution of metal seems to be uniform as determined by the measurement of the wall thicknesses of the bulged portion at various places. By heat-treating the work piece after it has been intially bulged it may be bulged still further in another mold, by having a larger cavity by the same apparatus. The extent to which a piece may be bulged and enlarged seems to be limited only by the amount of metal contained in the portions of the work piece confined in the runners 20 and 21.

In order to regulate the amount of infeed of undeformed stock from the runners 20 and 21, valves 40 and 41 are provided. These valves are actuated by cams 42 and 43 carried by the piston rods 30 and 31 of the cylinders 24 and 25. When the pistons in the cylinders 24 and 25 have moved forwardly a predetermined distance to feed a predetermined length of undeformed tubular stock into the die cavity, the cams actuate the valves to closed position and thereby block the discharge of hydraulic fluid from the low pressure or exhaust side of the pistons. The pressure for operating the piston rods 30 and 31 forwardly is admitted through fittings 44 and 45. As the pistons in cylinders 24 and 25 move forwardly fluid is discharged from the opposite side of the pistons through fittings 46 and 47. When the valves 40 and 41 are closed the discharge of fluid from fittings 46 and 47 is blocked, thereby arresting movement of the pistons in cylinders 24 and 25. The shape of the cams 42 and 43 may be such that the throttling of the discharge from fittings 46 and 47 is regulated to control the rate at which the undeformed tubular stock is injected into the mold cavity 19.

Cylinder 36 is provided with an inlet fitting 49 through which fluid is admitted for moving the piston 37 in the direction to inject bulging fluid into the work piece and a fitting 50 through which fluid is admitted for returning the piston 37 to its initial position, that being the position of the piston indicated in broken lines in Fig. 2.

To further control the rate at which the infeed cylinders advance in a direction to inject undeformed stock into the mold cavity 19, the discharge or low pressure side of the pistons are provided with flow-rate control devices 53 and 54. These devices may be in the form of conventional flow control or metering valves to restrict or limit the release of fluid from the discharge ends of power cylinders 24 and 25, thereby establishing back pressure on the pistons thereof during the feeding and bulging operation as subsequently described.

The check valves 33 and 34 are illustrated in Figs. 20 and 22 respectively. As shown check valve 33 comprises a split housing 56 which is adapted to be so placed on the piston rod 30 as to embrace the same. The housing is bolted to the rod by bolts 57. As shown in Fig. 20 the rod 30 is provided with a flat 58 through which is a bore 59 leading to the interior of the rod 30. A valve body 60 seats on the flat 58 and is sealed thereon by means of a gasket 61. The body 60 is held down on the rod 30 by the housing half 56 and overlapping flanges 63 and 64 on the body and housing parts respectively. The body 60 is threaded into an inlet fitting 65 and is sealed by means of a gasket 66. Within the valve body is a valve 67 that is urged towards its seat by means of a spring 68. Pressure on the inside of the rod 30 acts on the valve 67 to seat it. When fluid is injected into the work piece 18 to fill it, fluid pressure is supplied through the inlet 70. That pressure is high enough to unseat the valve 67 and allow the liquid to flow into the rod 30 and to the work piece 18. When the fluid is flowing into the work piece, check valve 34 is held open.

In Fig. 21 the check valve is shown in section taken on line XXI—XXI of Fig. 20. As there illustrated the sides of the valve 67 are fluted as at 72 to allow the fluid to flow past the valve when unseated, into the rod 30.

The details of check valve 34 are similar to those of valve 33 in most respects, and to that extent similar parts are identified by the same reference characters with primes affixed. Since check valve 68' of valve 34 must be opened against the pressure in the rod 31, a positive means is provided for opening it. As illustrated the valve 72 within the body 60' is provided with a piston 73 that is connected to the valve by a stem 74. The piston 73 works in a bore 75 of a housing 76. Pressure for opening the check valve is admitted through a port 77 while fluid discharging from the rod 31 when the check valve is open, passes the fluted member 72 and out of the outlet port 78.

The hydraulic fluid pressure for operating the power cylinder 7 is supplied by a pump 80, driven by a motor 81. This pump also provides fluid for flushing or scavenging air from the tube blank before the bulging and feeding phases of the operation are commenced. In addition, high pressure fluid for bulging and tube feeding purposes is supplied by high pressure pump 82 driven by a motor 83 while a low pressure pump 84, which may also be driven by motor 83, is provided to furnish fluid to the cylinders 24 and 25 for moving the pistons thereof into sealing engagement with the ends of a tube blank placed within the mold.

Hydraulic fluid for operating the power cylinder 7 is delivered by pump 80 through a line 86 to a pilot valve 87 which is spring centered and actuated to one or the other of its positions by fluid pressure. When the valve is in one position, fluid flows through pipe 88 to the top of cylinder 7 thereby causing the piston to move downwardly and close the mold. As the piston moves downwardly, fluid on the lower side of the piston is discharged through a pipe 89 and the valve 87, the discharge being returned to a tank 90 from which the pumps draw their supply of fluid. In Fig. 1 the return drain from valve 87 is indicated by the symbol 91.

When the valve 87 is actuated to the other of its positions the hydraulic fluid flows in pipe 89 to the lower side of the piston in cylinder 7 thereby actuating the mold to open position. In that case the fluid on top of the piston is discharged through pipe 88, valve 87 and returns to the tank 90.

Valve 87 is actuated by a solenoid operated pilot valve 93. The valve is illustrated schematically in Fig. 1 and more or less in detail in Fig. 23. As shown valve 93 is provided with solenoids 94 and 95 that are connected to the valve 96 as shown in Fig. 23. Compression springs 97 and 98 normally urge the valve 96 to neutral position. When solenoid 94 is energized the pilot valve 96 is moved to a position where fluid is introduced into chamber 99 in the valve body which causes the main valve 100 to move to the left in Fig. 23. In this position fluid pressure is supplied to pipe 88 to effect the closing stroke of cylinder 7. When the solenoid 95 is energized, pilot valve 96 is moved to the left and fluid pressure is admitted to chamber 101 causing the valve 100 to move to the right as seen in Fig. 23, whereby pressure is admitted to pipe 89 and to the lower end of the power cylinder 7 to effect the opening stroke of the mold. Springs 102 and 103 act to center the valve 100 in its neutral position. In the preferred construction, to provide a safety feature, valve 93 is under double push-button control, thereby insuring that each of the hands of the operator will be occupied in pressing the push-buttons before the valve can be operated to admit pressure fluid to power cylinder 7 to close the mold upon a work piece.

The fluid supplied to check valve 33 may be derived from the supply pipe 86. As illustrated the fluid flows through a branch pipe 104 to a valve 105 which is actuated to open position by means of a solenoid of 106. That solenoid is energized by the control system illustrated in Fig. 4 and which will be described infra.

The fluid discharging from the work piece in the mold during the filling operation thereof is controlled by a valve 109 that is operated by a solenoid 110 which also is energized at the proper moment by the control system.

The hydraulic fluid for operating the pistons in the cylinders 24 and 25 in a direction to seat the seals 26 and 27 in the ends of the work piece 18 is controlled by a pilot valve 111, controlled by a solenoid actuated pilot valve 112. The pilot valve 111 and the solenoid actuated pilot valve 112 are similar in all respects to the pilot valve 87, as described in connection with Figure 23. Pilot valve 112 is provided with solenoids 113 and 114. Solenoid 113 is energized when fluid is to be supplied to cylinders 24 and 25 to actuate the seals to sealing position with the work piece in the mold. When solenoid 113 is energized, the fluid flows from pump 84 through valve 111, pipe 115 to a pipe 116, located between and connected to a pair of check valves 117 and 118. These check valves are set to be opened by the pressure in pipe 116 so that the fluid will flow into the cylinders 24 and 25 to actuate the pistons therein to the left in Fig. 1. As the pistons in cylinders 24 and 25 move forwardly, fluid on the opposite side of those pistons is discharged through pipe 120, the flow-rate control device 53, valve 33, to a pipe 121 and pipe 122, to the discharge port of valve 111 from which the fluid is returned to tank 90. The fluid delivered to cylinder 25 forces that piston to the left so that the liquid on the low pressure side thereof is discharged through pipes 123 and 124, flow-rate control device 54, valve 34 and pipe 125 to the return pipe 122. As the seals enter the open ends of the work piece 18 the resistance offered by the work piece stops further advance of the pistons because the pressure supplied for the sealing strokes is limited.

The solenoid 114 being energized, the pilot valve 111 is actuated to a position admitting pressure into the low pressure sides of pistons 24 and 25, causing them to move to the right in Fig. 1. In that case the hydraulic fluid flows from valve 111 through pipe 122, pipes 121 and 120, 125, and 123, to cylinders 24 and 25, respectively. As shown in the drawing there is a check valve 130 between pipe 121 and pipe 120 and a check valve 131 connecting pipes 125 and 123. These check valves are designed to open when hydraulic pressure is supplied to pipe 122 when solenoid 114 is energized. Thus as the fluid pressure is admitted through check valves 130 and 131, the pistons in cylinders 24 and 25 move to the right and retract the seals 26 and 27 from the open ends of the work piece. The rate at which hydraulic fluid is supplied to the pistons in cylinders 24 and 25 when they are being actuated into the open ends of the work piece is controlled by a flow-rate device 133 which, like the valves 53 and 54, may be in the form of a conventional metering valve.

The pump 82 supplies the hydraulic fluid under high pressure for operating the piston 37 in cylinder 36. The supply of fluid to cylinder 36 is controlled by a pilot valve 135 that is actuated by a solenoid actuated pilot valve 136. Valve 136 is actuated by solenoids 137 and 138. Valves 135 and 136 may for purposes of this case be identical with the valve illustrated in Fig. 23. When solenoid 137 is energized, pilot valve 135 is actuated to a position that causes the hydraulic fluid to be supplied by pump 82 through pipe 140, valve 135, pipe 141, flow-rate control device 142, and pipe 143 to the right-hand end of cylinder 36, whereupon piston 37 moves forwardly (to the left in Fig. 1) on its bulging or forming stroke. As the piston 37 moves forwardly, the fluid within the hollow of rod 26 is injected into the hollow work piece at high pressure. It will be observed that the area of piston 37 is materially greater than the area of rod 38. Therefore the unit pressure in front of the rod 38 will be much higher than the unit pressure acting through pipe 143 on the piston 37. In pipe 143 is a check valve 144 that is held closed by the pressure when the flow is through pipe 143 into the right-hand end of cylinder 36. However valve 144 opens when the piston 37 is actuated in the reverse direction in which case the fluid discharges through pipe 143, valves 144 and 135, and pipe 146 which returns the fluid to the tank 90. Branching off pipe 143 is a pipe 148 that leads to a pressure-controlled valve 149 to branch pipes 150 and 151. This may be a differential sequence valve of conventional construction, such as the sequence valve produced by Racine Hydraulics and Machinery Inc., Racine, Wisconsin, or may be of the pilot control type as desired. These branch pipes as shown lead to the high pressure ends (the right-hand ends) of cylinders 24 and 25. When it is required to feed stock from the end or ends of the work piece into the cavity of the mold, the pressure supplied through valve 149 will be materially higher than that supplied when the seals are seated and it will be equal to the pressure in pipe 143. That pressure is high enough to seat or close the check valves 117 and 118. When the pressure has reached the point where valve 149 opens, the pistons in cylinders 24 and 25 move forwardly and force tubular stock into the cavity.

As internal pressure supplied by the piston in cylinders 36 increases, the pressure exerted longitudinally upon the work piece by the pistons in hydraulic cylinders 24 and 25 simultaneously increases. However, as the work piece commences to bulge in response to the internal pressure, that is, as the yield point of the metal is reached, the blank loses its ability to resist the feed force which is being exerted upon it by the feed pistons. Thus, in effect the feed pressure is applied simultaneously as the work piece becomes least strong longitudinally. However, over-feeding of the work piece, or feeding at a rate or in an amount which might otherwise cause buckling of the work piece within the mold cavity is prevented through the functioning of metering valves 53 and 54 installed in the outlet lines 120 and 123 of the feed cylinders. Thus, during simultaneous bulging and feeding, liquid is trapped ahead of the pistons in the feed cylinders and is allowed to escape therefrom only at rates dictated by the metering valves 53 and 54. In this manner, restrained advance of the pistons of the feed motors permits feed of metal to occur at a rate coordinated with the bulging of the work piece. This enables consistent and uniform production of work pieces which are bulged properly to external shape without undue reduction of wall thickness and without buckling through over-feed.

The length of the in-feed strokes are regulated and limited by the cam actuated valves 41 and 42. When a predetermined amount of stock has been fed, the movement of the pistons in cylinders 24 and 25 is arrested by the blocking of discharge of fluid through pipes 120 and 123.

Between the inlet and outlet of valve 149 is a check valve 153. Since the pressure on the side of the valve directly connected to pipe 148 is higher than the pressure in pipe 150, the check valve will be seated (closed) even when valve 149 is open. When the pistons in cylinders 24 and 25 are retracted pressure is admitted to pipes 120 and 123; and the hydraulic fluid on the high pressure side of these pistons is discharged through line 150, check valve 153, lines 148 and 143, past check valve 144 through the now open ports of valve 135 and line 46 to the sump. The pressure for actuating the pistons in cylinders 24 and 25 is supplied from pump 84. Thus, energization of solenoid 114 actuates valve 131 to admit pressure through lines 122 and 121 past valves 130, 131 to the respective lines 120 and 123 communicating with the cylinders 124 and 125.

Connected to pipe 115 is a pressure switch 160. That switch is operative in the control circuit to perform a control function to be described infra, namely, to prevent pilot valve 87 from being actuated to a position to open the mold until the pressure in pipe 115 has been reduced to a predetermined low value. Pressure switch 160 is also operative to prevent energization of solenoid 113 until the pressure in pipe 115 has been built up to a predetermined value.

Connection to pipe 143 is a pressure switch 161. A function of this switch in the control system is to discontinue the bulging stroke of piston 37 when the bulging pressure has reached a predetermined maximum value as when the walls of the bulged portion of the work piece contact the corresponding wall of the mold cavity. The functioning of pressure switch 161 will be described infra.

The control circuits for the pump motors 81 and 83, for the solenoid valves and other devices that control the apparatus of Fig. 1 are illustrated in Fig. 4.

The straight-line circuit diagram shown in Fig. 4 is supplied by a transformer 169, the secondary of which supplies voltage for the supply lines 170 and 171. The circuit includes a master start push button switch 172, a pair of series connected master stop button switches 173 and 174; a manually operated switch 175 which may be actuated to either manual or automatic control position, and the solenoids 175' and 176 that actuate the motor starters for pump motors 81 and 83 respectively. The electrical circuit includes a mold-up or mold opening control button switch 177, a mold-down push button switch 178, and a pair of series connected palm button switches 179 and 180. The palm button switches 179 and 180 require the operator to use both hands to initiate operation of the apparatus. In other words, unless the palm buttons 179 and 180 are held closed, which require the simultaneous use of both hands, the mold will not close.

The circuit also includes a push-button switch 181 which controls the operation of the seal cylinders 24 and 25 to the position where the seals 26 and 27 enter the open ends of the work piece 18 in the mold, when manual control is employed, a seals-out push-button switch 182, also used on manual operation, and a form-on or bulge push-button switch 183, and a bulge return or off button switch 184.

The control system includes in addition to the motor starter solenoids 175' and 176, a plurality of control relays designated CR1, CR1A and CR2 through CR9, both inclusive, (see Figs. 5 through 14 both inclusive) the solenoids 94, 95, 106, 110, 113, 114, 137, 138, and a solenoid 106 HE. The solenoid 106 HE is employed to control a heat exchanger HE shown in Fig. 1 which is provided for cooling the hydraulic fluid in the supply tank 90.

The solenoids are controlled by the various CR relays above identified.

Figure 5:
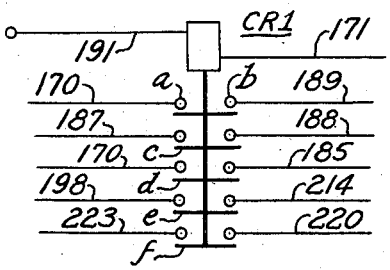
Figure 6:
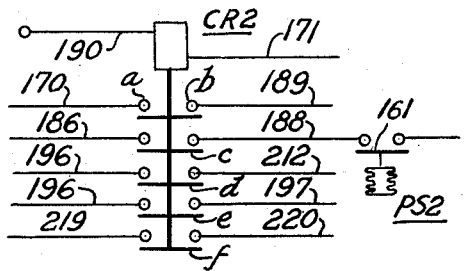
Figure 7:
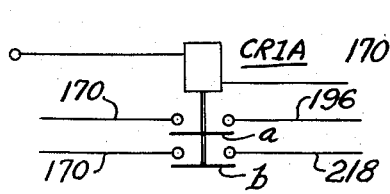
Figure 8:
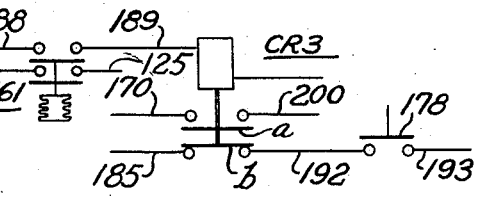
Figure 9:
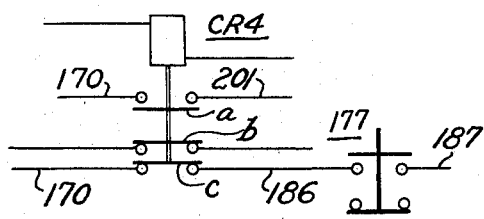
Figure 10:
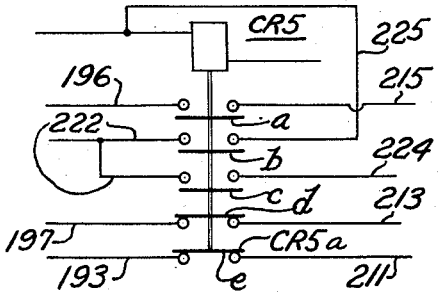
Figure 11:
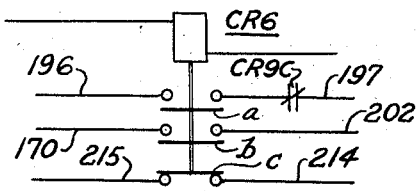
Figure 12:
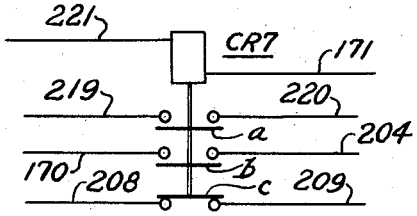
Figure 13:
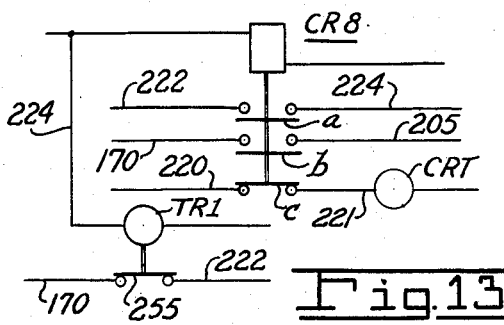
Figure 14:
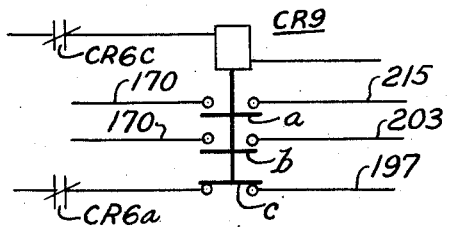

To simplify the tracing of the various circuits for the control relays and solenoids, the diagram of Figure 4 has been provided with numerals leading from the supply conductor 170 to the opposite supply conductor 171 and these numerals are also shown in the various views Fig. 5 through Fig. 14, for the purpose of identifying the various contact members of these relays that are operative in the various circuits. Thus, for example, the circuit for relay CR1 that is established when the switch 175 is in manual position, the master start button 172 being closed, extends from one side of the secondary of transformer 169 through switches 173 and 174, the switch 172, a pair of normally closed safety relay switches 172A and 172B, supply conductor 170, the manual switch 175, conductor 191, and the solenoid of control relay CR1 to conductor 171. Thus as shown in Fig. 5 the portion of the circuit extending from conductor 170 through the switch 175 in its manual-control position is indicated by the reference characters 170, 191, the solenoid of control relay CR1, and conductor 171.

Control relays CR1 and CR1A function only when the apparatus is operated under manual control. When under automatic control, the control relay CR2 functions.

As shown in Fig. 5, control relay CR1 is provided with five normally open contact members *a*, *b* and *c* through *f*. Relay CR1A is provided with two normally open contact members *a* and *b*. Control relay CR2 is provided with five normally open contact members *a*, *b* and *c* through *f* and the control relay CR3 is provided with contact members *a* and *b*, one normally open and the other normally closed. Control relay CR4 is provided with one normally open contact member *a*, and two normally closed contact members *b* and *c*, while control relay CR5 is provided with three normally open contact members *a*, *b* and *c* and two normally closed contact members *d* and *e*. Control relay CR6 is provided with two normally open contact members *a* and *b* and one normally closed contact member *c*, while control relay CR7 is also provided with two normally open contact members *a* and *b* and one normally closed contact member *c*. Each of control relays CR8 and CR9 are provided with two normally open contact members *a* and *b* and one normally closed contact member *c*.

The control circuit also includes the pressure switches 160 and 161 (see Figs. 15 and 16 respectively). Pressure switch 160 is provided with a normally open contact member *a*, while pressure switch 161 is provided with two normally open contact members *a* and *b*. The relay is designed to close contact *a* at a predetermined relatively low pressure and to close member *b* at a much higher pressure. There is also included in the control circuit a pair of timing relays TR1 and TR2 (see Figs. 17 and 19). Timing relay TR1 is provided with a normally closed contact member *a* which is timed to open when a predetermined length of time has elapsed after its actuating solenoid TR1S has been energized. Relay TR2 is provided with one normally closed contact member *a* which is timed to open after an elapse of time and another contact member *b* which is timed to close after the lapse of a predetermined length of time following the energization of its solenoid TR2S.

Assuming that the apparatus illustrated in Fig. 1 is to be operated on automatic control, switch 175 is placed in automatic control position. When the switch is in automatic position and the master switch 172 is closed, the control relay CR2 is energized through the circuit including the normally closed switches 173, 174, the master start switch 172, conductors 170, the switch 175, conductor 190, the solenoid of control relay CR2 to line 171. Upon the energization of relay CR2, its five normally open contact members are closed, whereby a circuit is established for the motor starter switches 175' and 176, the circuit extending from conductor 170 through contact members CR2*ab*, conductor 189, through the solenoids of starters 175' and 176 to line 171. Upon the closing of the motor starters 175' and 176, holding contact members 175A and 176B close, thereby bridging the start button 172 so that the circuit for control relay CR2 will be maintained until either or both of the stop buttons 173 and 174 are opened.

In order to bring the mold down to closed position, the palm buttons 179 and 180 must be closed by the operator. When these are closed, a circuit is completed for control relay CR4 which extends from conductor 170 through a normally closed contact member *a* of mold up button 177, conductor 195, the palm button switches 179 and 180, conductor 193, normally closed contact member CR5*b* of relay CR5, conductor 211, the solenoid of relay CR4 to conductor 171. When control relay CR4 is energized and closed, solenoid 95 is energized as normally open contact member CR4*a* is closed. The circuit for solenoid 94 extends from line 170 through contact member CR4*a*, conductor 201, solenoid 95 to line 171. Solenoid 94 actuates the pilot valve 87, which as above stated admits pressure to the upper end of cylinder 7, causing the piston to move downwardly and to close the mold.

When the mold reaches closed position, the limit switches 15*a* and 15*b* of switch 15 close, whereby a circuit is established for control relay CR6. That circuit extends from conductor 170 through the normally closed contact member *a* of the mold-up switch 177, conductor 195, contact members 15*a* and 15*b* of the limit switch 15, contact member *d* of control relay CR2, conductor 196, contact member *d* of relay CR2, conductor 197, normally closed contact member *a* of relay CR5, the solenoid of relay CR6 to conductor 171.

When relay CR6 is energized, solenoid 113 is energized, the circuit of which extends from conductor 170 through contact member *b* of relay CR6, normally closed contact members *a* of limit switches LS3 and LS4 (these being operated to open position in the event that the seal actuating piston in cylinders 24 and 25 overtravel), conductors 216 and 217, the solenoid 113 to conductor 171.

Upon the energization of solenoid 113, the pistons in cylinders 24 and 25 move forwardly to seat the seals 26 and 27 in the open ends of the work piece 18. As soon as the pressure in line 115 builds up to a predetermined value following the energization of solenoid 113, pressure switch 160 closes its contact members (see Fig. 15) whereupon the solenoid S of relay TR2 is energized. Relay TR2 being energized, the solenoid S thereof urges its armature downwardly whereby pressure is exerted on a diaphragm D of the relay. The diaphragm acts on liquid in a chamber 250 of the relay, causing that liquid to be forced through an orifice 251 into a chamber 252. As the liquid fills the chamber 252, pressure is exerted on a diaphragm 253 that acts against the force of a spring 254. When the pressure in chamber 252 rises sufficiently to overcome spring 254, contact members 255 of the relay are opened. The length of time it takes to open contact members 255 determines the length of time that solenoid 106 is energized. Solenoid 106 controls valve 105. But before the contact members 255 open, solenoid 110 of valve 109 will have been energized, to supply the pressure for opening the check valve 34. Thus when the solenoid valves 105 and 109 are opened, liquid is supplied to the work piece 18. The liquid flows until the contact members 254 of relay TR2 are opened. This length of time is sufficient to effect scavenging of the air from the work piece and the hollow of piston rod 30 and the filling thereof with liquid. Upon the opening of contact members 255, solenoids 106 and 110 are de-energized.

The orifices of relays TR1 and TR2 may, as shown, function as quick release valves, when the pressure in chambers 250 are relieved. When relieved, the springs 254 urge the diaphragms 253 upwardly whereby the pressure in chambers 251 unseat the orifices 251 to allow the fluid in chambers 252 to quickly pass to chambers 250.

The work piece 18 having been filled with liquid and scavenged of air, the piece is now in condition to be bulged or formed in the mold. As the pressure builds up on the diaphragm 253 of timing relay TR2, contact members 256 thereof are closed. These contact members are closed at the end of a predetermined time interval. When closed, a circuit is established for control relay CR7 that extends from conductor 170 through contact members 256 of relay TR2, the form-off or return push button switch 257 which is used during manual control, conductor 219, contact member *f* of relay CR2, conductor 220, normally closed contact member *c* of relay CR8, conductor 221, the solenoid of relay CR7 to conductor 171. On the energization of control relay CR7, solenoid 137 is energized, whereby fluid pressure is supplied by pump 82 through valve 135, pipes 141 and 143 to the right-hand end of cylinder 36. That pressure causes piston 37 to move to the left and force increasing volumes of liquid at increasing pressures into the work piece 18 to bulge or form the same.

As the work piece 18 enlarges in the mold cavity and the walls of the enlarged portion thereof begin to engage the walls of the cavity, the pressure developed by piston 38 will increase to a point where valve 149 is opened admitting high pressure to the cylinders 24 and 25, causing the pistons thereof to force portions of the work piece lying in the mold runners into the die cavity. As the metal is being fed into the die cavity, piston 38 continues to move to the left in Fig. 1 to supply more bulging liquid at bulging or forming pressure to the work piece. As the metal of the bulged portion more fully engages the walls of the mold cavity, the forming pressure rises to a still higher value, at which time pressure-switch 161 operates to close its contact members $b$ to establish a circuit that energizes control relay CR5.

When relay CR5 is energized, the normally closed contact members $e$ thereof are opened, whereby control relay CR4 is de-energized. The energizing of relay CR5 stops the bulging and infeed operation and prepares the circuits for effecting a withdrawal of the seals 26 and 27 from the work piece and, finally, the opening of the mold.

As shown in the schematic diagram, Fig. 4, when normally closed contact members $e$ of relay CR5 are open, control relay CR6 is de-energized. Relay CR6 being de-energized, solenoid 113 is de-energized. When relay CR6 is de-energized, its normally closed contact members $c$ establish an energizing circuit for control relay CR9. Solenoid 114 is energized, when control relay CR9 is energized, whereupon valve 111 is actuated and the pistons in cylinders 24 and 25 are retracted and moved to the right in Fig. 1 until the seals 26 and 27 have been withdrawn from the work piece. Also, solenoid 138 of valve 136 has been energized to effect a retraction or movement of piston 37 to the right as shown in Fig. 1.

The seals 26 and 27 are not retracted until the pressure in line 143 has been reduced to a value at which pressure switch PS2 opens its contact members $a$. When that has happened, the solenoid 95 is energized and its pilot valve 87 is actuated to the position where fluid under pressure is admitted by pipe 89 to the lower side of the piston in cylinder 7. The piston then moves upwardly, opens the mold. When the piston reaches its upper limit of travel, the limit switch 16 operates to prevent overtravel in that direction. Thus, it will be observed that opening of the mold does not occur until the pressure in the work piece has been relieved. To repeat the cycle, the operator removes the bulged blank from the mold, inserts another blank therein, and then closes the palm button switches 179 and 180.

To indicate that the molds are closed at any time, an indicating signal 270 is provided. That signal is connected between limit switch contact member 15$b$ and contact member $d$ of relay CR2 and conductor 171.

In order to operate the system on manual control, switch 175 is placed in manual position, in which case control relays CR1 and CR1A are energized which, in turn, operate to energize the motor starter solenoids 175' and 176. Relay CR1A provides a circuit directly from line 170 to line 169, whereby voltage is provided for the seals in button switch 181. The first step in the operation on manual control after the control relays CR1 and CR1A have been energized, is that of closing the mold down-button switch 178, whereby relay CR4 is energized. The next step is to close push button switch 181 and energize relay CR6. Next, the form-on push button switch 183 is closed to energize control relay CR7. After the button switch 183 has been closed, the system functions to bulge the work piece in the mold and to feed metal from the runners of that mold into the die cavity. When the cycle of bulging and infeed has been completed, the next step is to close the form return button 184, whereby relay CR8 is energized. When this has been accomplished, piston 37 is retracted and pressure is relieved in the work piece. The seals 26 and 27 are retracted from the work piece by depressing button switch 182. When the seals have been withdrawn, the operator depresses the mold up button switch 177, whereby the mold is raised to its full open position.

Having thus described the invention, it will be apparent to those of ordinary skill in the art to which the invention pertains that various modifications and changes may be made in the illustrated embodiment without departing from either the spirit or the scope of the invention. Therefore what is claimed as new and desired to be secured by Letters Patent is.

1. Mechanism for bulging a metal tube to a predetermined shape, said mechanism comprising a mold adapted to receive and support the metal tube which is to be bulged and having a cavity therein conforming to the shape to which said metal tube is to be bulged, said mold comprising relatively movable members, means for holding the members in engagement during a bulging operation, means engageable with the ends of said metal tube when it is seated in said mold for closing the ends while maintaining liquid communication with the interior of the metal tube, at least one of said means including an hydraulic feed cylinder having a piston, the endwise portion of which is engageable and disengageable from an end of said metal tube, means for causing flow of liquid through said metal tube after the end of the piston is in engagement therewith, for scavenging air from said metal tube, means for trapping liquid in said metal tube after it is filled with liquid, means for supplying hydraulic fluid to the interior of said metal tube at a pressure sufficient to bulge the metal tube within said cavity, means for simultaneously applying said hydraulic pressure to one side of the piston in said feed cylinder whereby to exert an endwise force upon said work piece effective to feed said tube endwisely into said cavity in compensation of the flow of metal of said work piece during bulging, and means for releasably trapping hydraulic fluid against the opposite side of the piston in said feed cylinder, including a metering valve for gradually releasing the fluid trapped against the piston in said feed cylinder during bulging of the tube whereby back pressure exerted upon the said piston during metered release of the liquid trapped in said feed cylinder restrains the said thrust exerted on the piston thereof to prevent over-feeding of metal of said tube into said mold cavity in consequence of the reduction of the mechanical resistance of metal of the tube which occurs as it bulges in response to bulging pressure.

2. Apparatus as in claim 1 in which the said means for releasably trapping hydraulic fluid against the opposite side of the piston in said feed cylinder, also comprises a shut-off valve and a cam actuated by the piston rod of said cylinder for actuating said valve toward closed position to block discharge of liquid from said cylinder and thereby arrest motion of said piston when it has traveled a predetermined distance.

3. Mechanism for bulging a metal tube to a predetermined shape, said mechanism comprising a mold adapted to receive and support a tubular metal blank, the said mold comprising relatively movable members together defining a cavity external of a blank seated in said mold and conforming to the shape to which said blank is to be bulged, means for holding said members in engagement during a bulging operation, hydraulic cylinders respectively having pistons presenting tapered ends adapted for sealing engagement with endwise portions of a metal blank seated in said mold, means for supplying pressure fluid to said hydraulic cylinders for moving the tapered ends of said pistons into sealing engagement with the ends of said metal blank, the piston of one of said hydraulic cylinders being a feed piston for exerting an endwise force upon said metal blank to feed metal thereof into said cavity during bulging and thereby compensate for flow of metal of said blank in consequence of bulging, means for supplying hydraulic fluid into the interior of said metal blank under pressure sufficient to bulge the metal blank within said cavity, means for simultaneously supplying said hydraulic pressure to one side of the feed piston whereby to exert upon said blank through said feed piston a force sufficient to feed a portion of said blank into said cavity, and means for releasably trapping hydraulic fluid against the opposite side of said feed piston, including a metering valve for gradually releasing the fluid trapped against said feed piston whereby back pressure exerted upon the feed piston during metered release of trapped liquid counteracts the feeding force exerted thereon to prevent overfeeding of said blank into said mold cavity in consequence of the reduction of mechanical strength of the metal of the blank which occurs as it bulges in response to bulging pressure.

References Cited in the file of this patent

UNITED STATES PATENTS

| | | |
|---|---|---|
| 2,285,069 | Vickers | June 2, 1942 |
| 2,509,589 | Deardorff | May 30, 1950 |
| 2,713,314 | Lenthesser | July 19, 1955 |